Aug. 6, 1946.      S. G. GREEN      2,405,207
GUN FEED MECHANISM
Filed July 29, 1942      7 Sheets-Sheet 1
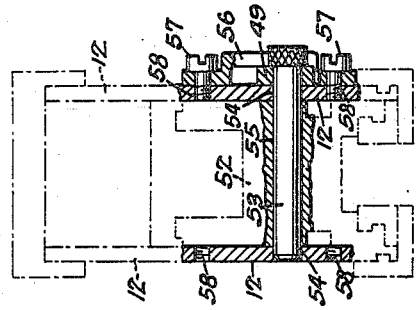
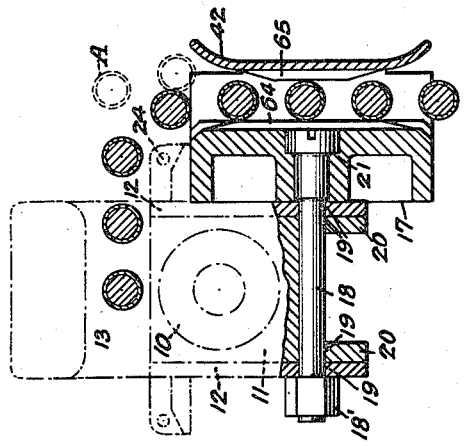
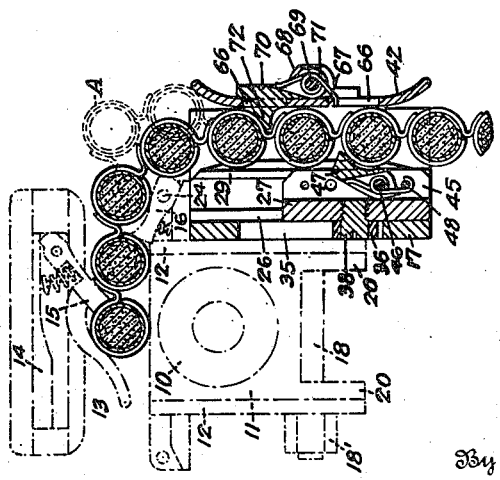
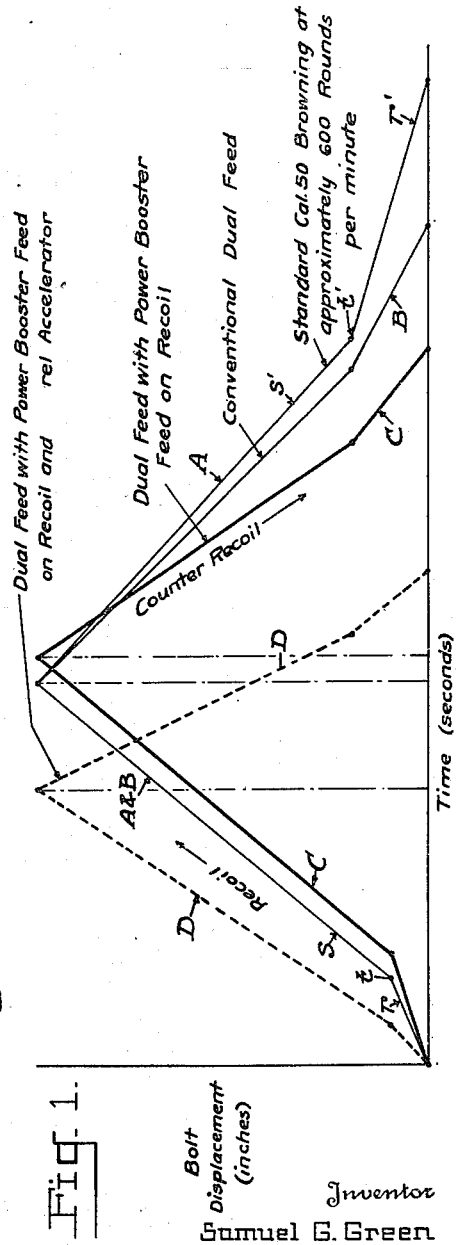
Inventor
Samuel G. Green

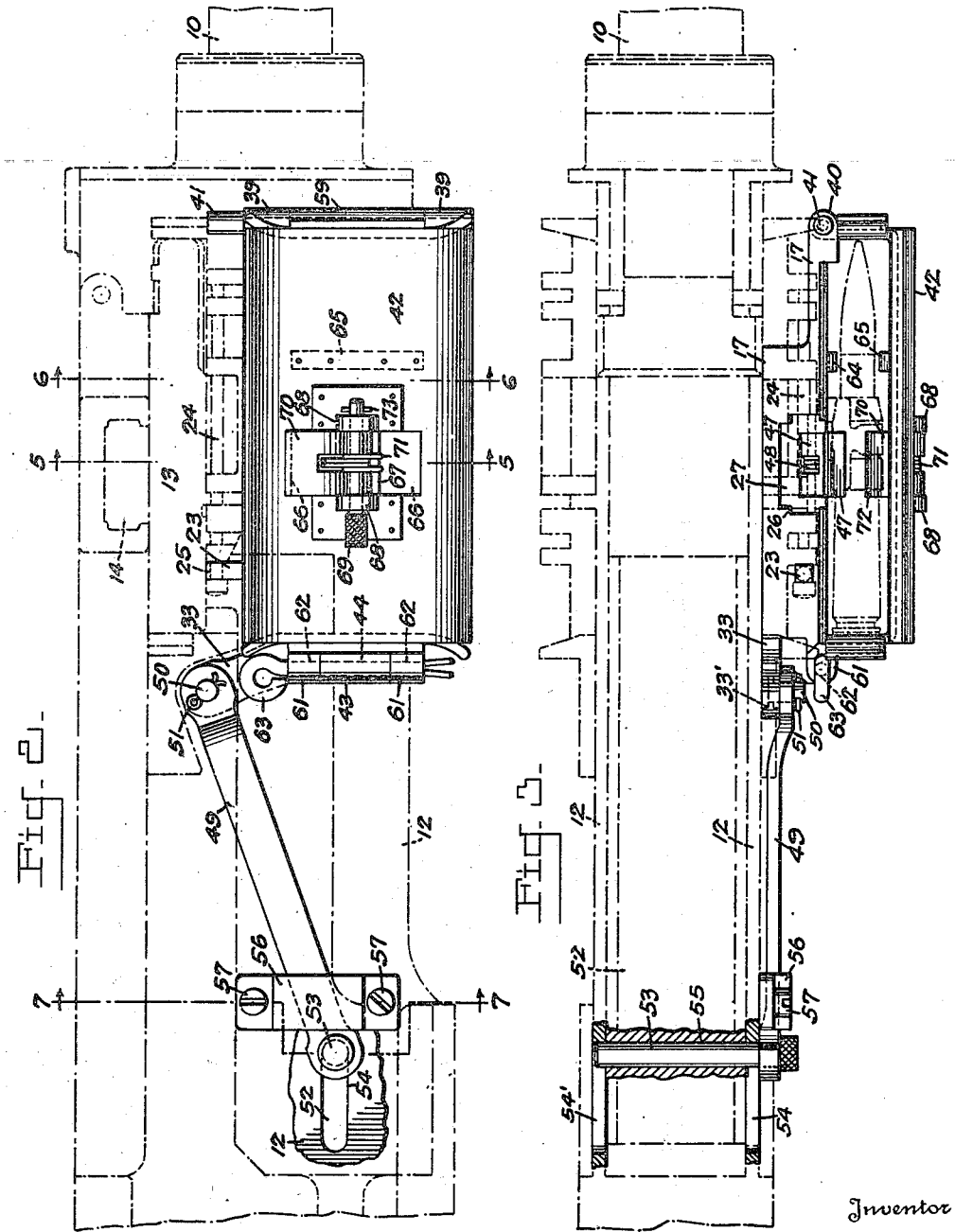

Aug. 6, 1946.   S. G. GREEN   2,405,207
GUN FEED MECHANISM
Filed July 29, 1942   7 Sheets-Sheet 3
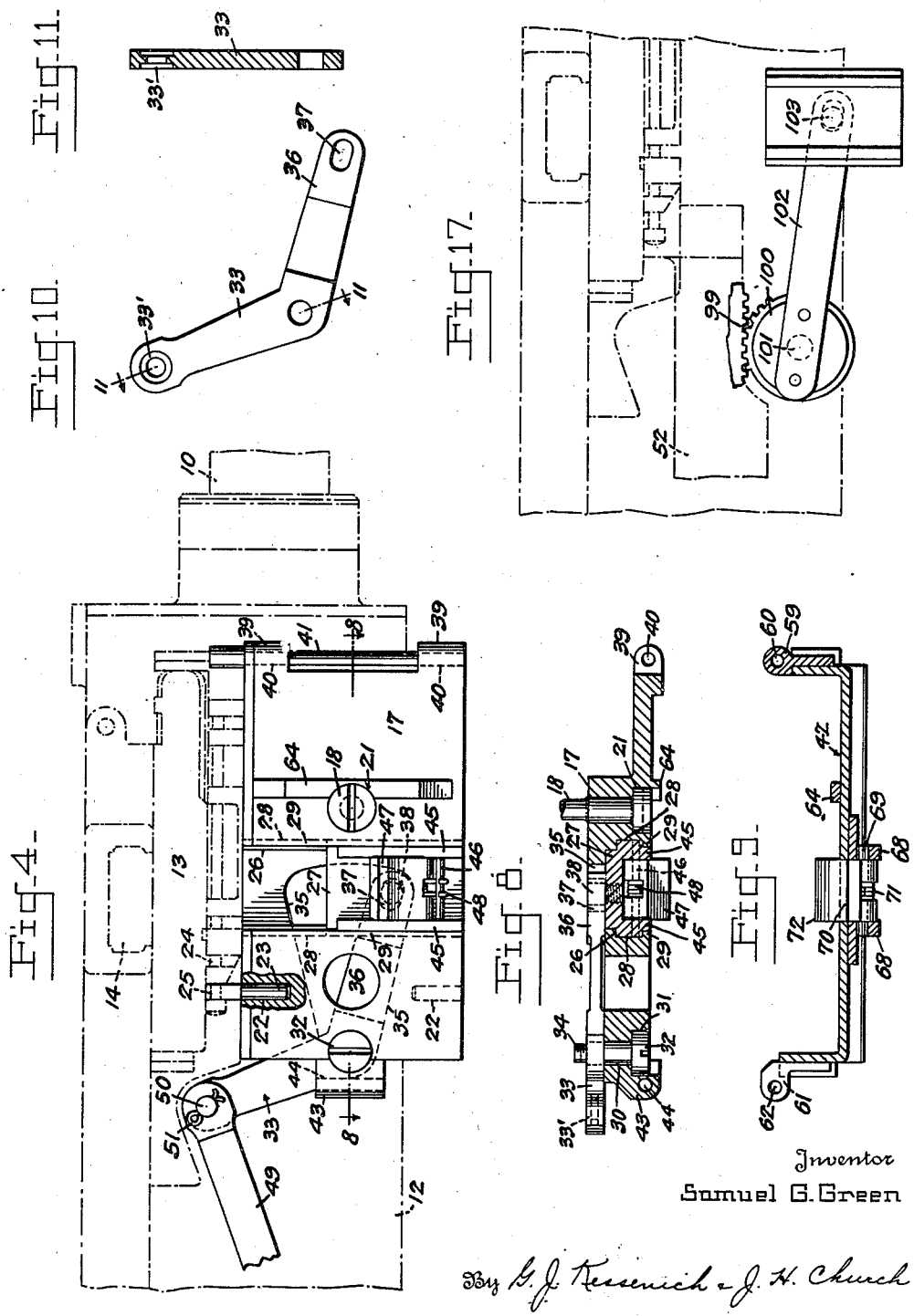
Inventor
Samuel G. Green

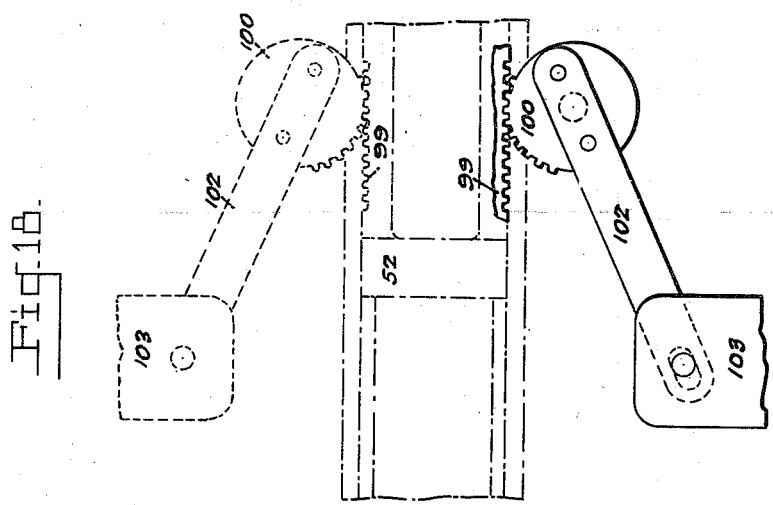
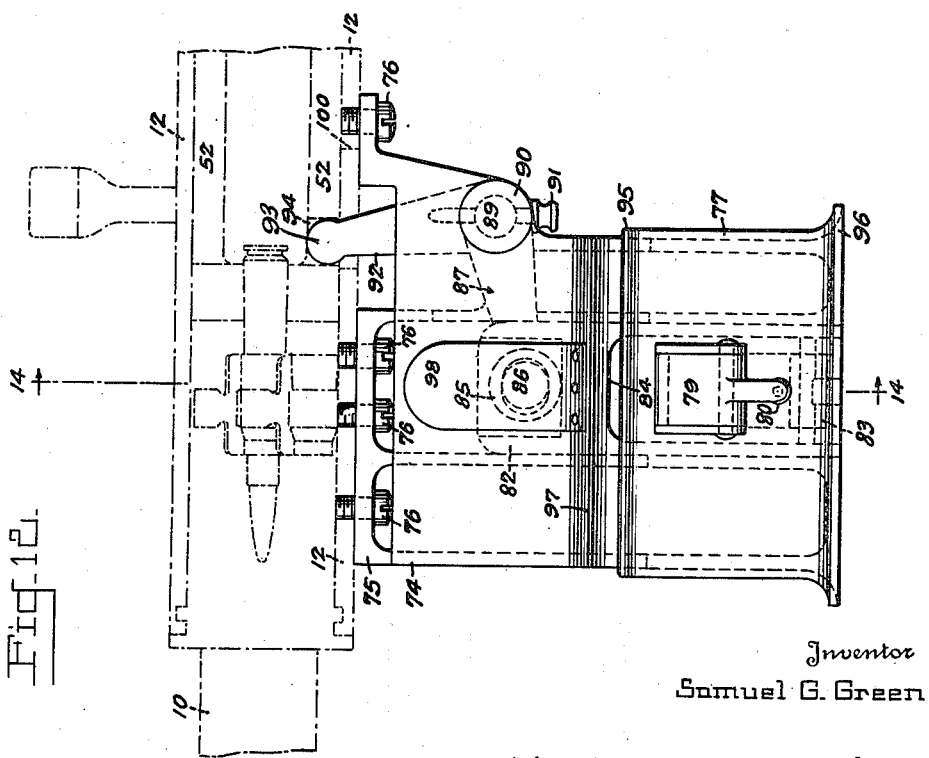

Aug. 6, 1946.     S. G. GREEN     2,405,207
GUN FEED MECHANISM
Filed July 29, 1942     7 Sheets-Sheet 5
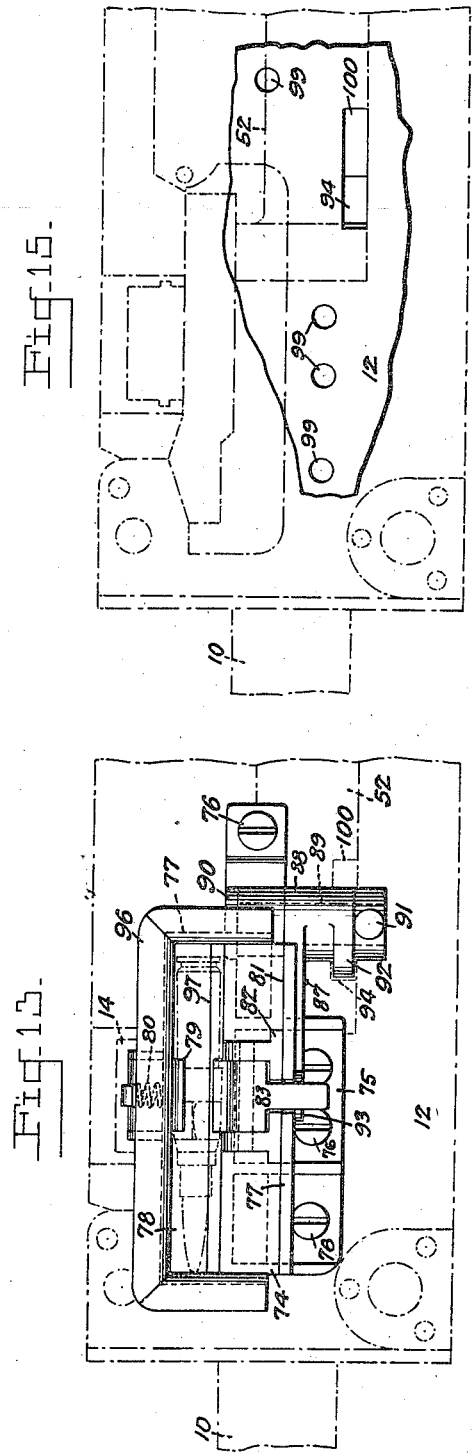
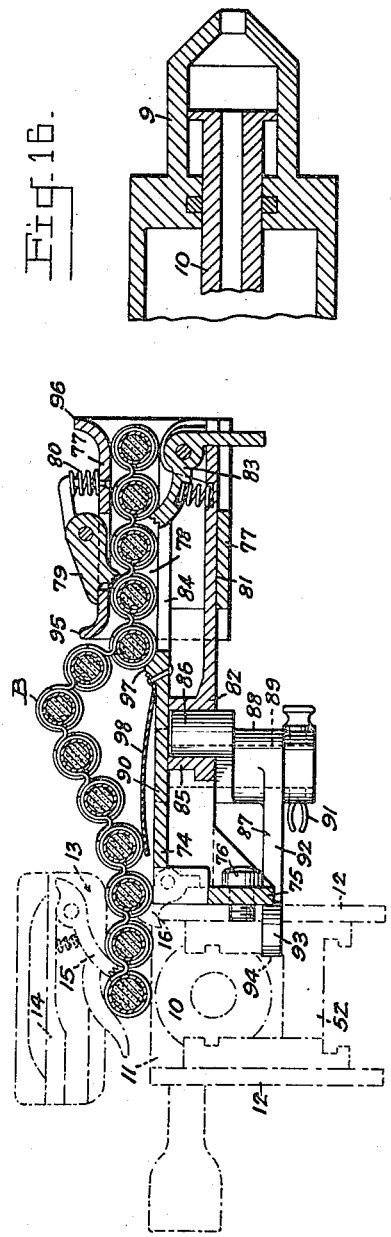
Inventor
Samuel G. Green
By G. J. Kessenich & J. H. Church
Attorneys

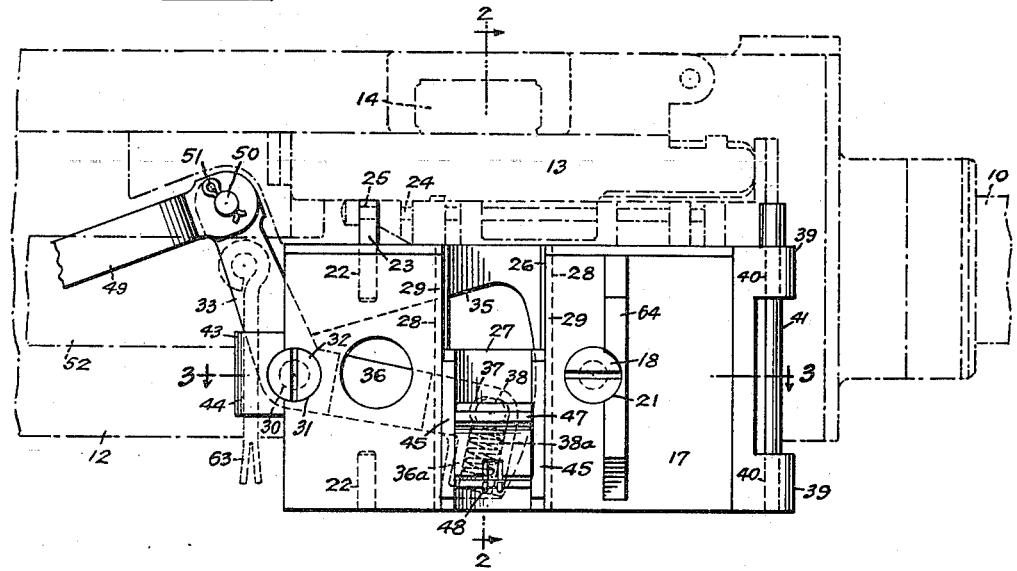

Aug. 6, 1946.   S. G. GREEN   2,405,207
GUN FEED MECHANISM
Filed July 29, 1942   7 Sheets-Sheet 7

Inventor
Samuel G. Green
By G. J. Kesenich & J. H. Church
Attorneys

Patented Aug. 6, 1946

2,405,207

UNITED STATES PATENT OFFICE 2,405,207

GUN FEED MECHANISM

Samuel G. Green, Gray, Ga.

Application July 29, 1942, Serial No. 452,764

7 Claims. (Cl. 89—33)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a gun feed mechanism and more particularly to an auxiliary ammunition feeding device directly coupled to the main power source of a machine gun or other automatic weapon, and represents a continuation-in-part of my application, Serial No. 440,582, filed April 27, 1942.

Modern warfare demands exceptionally high speed automatic weapons and hence necessitates an abundant and immediately available supply of ammunition which may be threaded to the gun. Long belts or interconnected links of projectiles are required, particularly on aircraft and other combat vehicles that are employed on long range and other missions which consume large quantities of ammunition. It is imperative that a strong, positive feed mechanism be employed to present the projectiles progressively to the gun without impairing its normal high speed functioning. An ideal arrangement for an automatic weapon is attained when the gun incorporates a self-contained feed unit which eliminates all outside sources of power to feed or accommodate the heavy belt load imposed on the weapon.

It is therefore the purpose of this invention to provide a power booster feed which is directly coupled to the main power source of the gun, performs the heavy belt lifting operation, and permits the conventional feed mechanism to move a comparatively negligible load of but a few cartridges.

An object of this invention is to provide a power feed or lift which is directly connected with the power source of an automatic gun, namely, the recoiling barrel or its associated barrel extension of the gas piston of a gas operated gun.

Another object of the invention is to provide a powerful, compact, auxiliary feed mechanism for boosting ammunition lifts to a machine gun or other automatic weapon.

It is an object of this invention to make full use of the conventional timed feed mechanism of guns such as the Browning or Vickers in conjunction with the instant power feed mechanism.

It is an object of the invention to provide an auxiliary feed mechanism for an automatic firearm to carry the main load of advancing the ammunition belt, and which mechanism shall have an increased time of impulse. And it is a further object of the invention to provide such a mechanism with a resilient coupling.

Other objects of the invention are: to provide a power booster feed which utilizes the tremendous power available in the recoiling barrel of many types of guns or the available force in the gas piston of a gas operated gun; to provide a dual feed for an automatic weapon with means for taking the heavy belt lift load off the conventional time feed mechanism (driven members) and lifting the belt load by the barrel, barrel extension, or the gas piston assembly (driving members); to relieve the driven members of the gun (bolt, feed slide, etc.) of the conventional drag and consequent delicate balance which is required to get proper operation; to provide a feed booster that can be readily applied to guns that feed either from the right-hand or the left-hand side; to use the same basic gun mechanism for a high speed gun or for a low speed gun; to provide a power booster feed for lifting the heavy belt on recoil to the feeding stage whereby the conventional feed mechanism is in a position to engage the belt and advance a small section thereof in accordance with its normal sequence of operation; to provide an overthrow arrangement in the power feed device which will insure the introduction of slack into a section of the belt adjacent the conventional feed mechanism so as to materially diminish the feeding effort load of the latter mechanism; to overcome the undesirable stretching of the belt which produces an excessive pitch distance between the cartridges in the proximity of and within the influence of the conventional feed mechanism; to provide means for using the available recoil force of the primary driving member of an automatic weapon for lifting heavy belt loads without slowing down the operation of the gun; to overcome the objectionable retardation of the bolt and the normal feed mechanism by relieving the bolt, a momentum driven member, of its heavy load on the counter-recoil stroke; to obtain a higher rate of fire from the gun and to provide means for securing more uniform velocity and acceleration of the bolt, thereby reducing to a minimum the impact forces delivered to the receiver of the gun; to obtain a uniform, belt power lift independent of the gun frame recoil or the elevation of the gun; to increase the rate of fire of standard machine guns without altering their present space limitations; to accomplish regulation and maintenance of gun feed timing independently of the bolt; to provide a comparatively simple, sturdy feeding device which may be coupled to a standard machine gun with little alteration in its structure to provide greater efficiency, as well as an increased rate of fire; to provide a smooth functioning, power feed mechanism that is directly coupled to a machine gun and which is adapted to feed a belt from a location substantially on the same level as the conventional feed mechanism of the gun; and to provide an auxiliary feed mechanism which can be used with a barrel accelerator on an automatic gun to provide a maximum rate of fire with a maximum belt load.

The specific nature of the invention as well as other objects and advantages thereof will clearly appear from a description of a preferred embodiment as shown in the accompanying drawings in which:

Fig. 1 represents a family of characteristic bolt displacement-time curves for a Browning cal. 50 machine gun under several conditions of operation, Fig. 2 is a side elevational view of the power feed mechanism mounted on the right side of a Browning machine gun adjacent the standard belt feed mechanism, Fig. 3 is a top plan view thereof, Fig. 4 is a view in side elevation of feed mechanism assembled on the right side of a Browning machine gun, the cartridge guide being removed and a portion of the base plate appearing in section to illustrate the simplicity of attachment, Fig. 5 is a vertical sectional view through the gun and power feed mechanism on the line 5—5 of Fig. 2 looking in the direction of the muzzle end of the gun, Figs. 6 and 7 are sectional views on the lines 6—6 and 7—7 respectively of Fig. 2, Fig. 8 is a sectional view through the base plate on the line 8—8 of Fig. 4 looking in the direction of the arrows, Fig. 9 is a sectional view through the cartridge guide on a plane corresponding to the section on line 8—8 through the base plate, Fig. 10 is a view in side elevation of the bell crank lever, Fig. 11 is a sectional view thereof on the line 11—11 of Fig. 10, Fig. 12 is a top plan view of a modified auxiliary feed mechanism mounted on the left side of a Browning machine gun and arranged to feed a cartridge belt from an area to one side of the gun, Fig. 13 is a side elevational view thereof, Fig. 14 is a vertical sectional view on the line 14—14 of Fig. 12, Fig. 15 is a view in side elevation of a portion of the left side of a gun illustrating the simple manner in which the standard gun is modified to receive the power feed attachment, Fig. 16 illustrates diagrammatically in axial section a barrel accelerator mounted on the muzzle end of a gun barrel, Fig. 17 is a diagrammatic showing of another means for imparting vertical reciprocation to the power feed slide from the axial reciprocation of the barrel extension, Fig. 18 is a similar representation of means for actuating the power feed slide transversely of the axis of the gun from the longitudinal movement of the barrel extension, Fig. 19 is a view in side elevation of a modified form of auxiliary feed mechanism assembled on the right side of a machine gun, the cartridge guide being removed, Fig. 20 is a section taken on the line 20—20 of Figure 19 with a belt of cartridges added, Fig. 21 is a section of the auxiliary feed mechanism taken on the line 21—21 of Figure 19.

Fig. 22 is a detail of the operating arm for the auxiliary feed mechanism,

Figure 24:
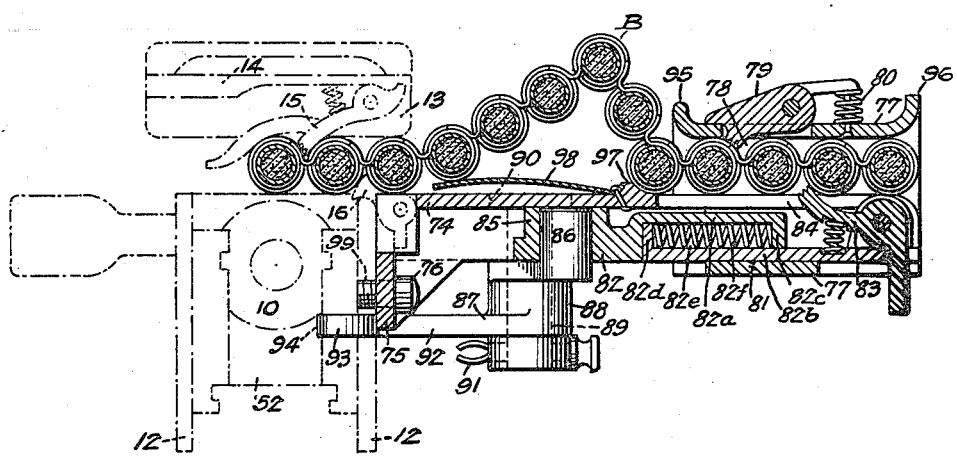
Fig. 24 is a section taken on the line 24—24 of Fig. 23.

Referring to Fig. 1, there is shown a family of bolt displacement-time curves for a Browning cal. 50 machine gun under four conditions of operation. Curve A approximates the actual photographic representation of the bolt displacement-time curve obtained when a cal. 50 Browning gun fired at a rate of about 600 rounds per minute. Curve B represents a similar curve for a gun which is employed in conjunction with an ordinary power booster feed. Curve C illustrates the characteristic curve for a self-contained dual feed gun constructed in accordance with the present invention wherein the power feed is operated from the recoiling barrel. Curve D is characteristic of a gun which incorporates a device of the present invention in conjunction with a barrel accelerator, preferably of the type embodied in the applicant's copending application, Serial No. 302,553 filed Nov. 2, 1939, now Patent No. 2,362,996.

Considering curve A, a cycle of operation, which includes recoil and counterrecoil, takes place in about one-tenth of a second. The recoil portion slopes upwardly and reaches a crest which marks the end of the recoil stroke and then the curve declines thereby outlining the counterrecoil portion. It will be observed that the recoil section of the curve includes portions $r$ and $s$ which have different slopes. Portion $r$ represents the recoil of the barrel, the barrel extension, and the bolt as a unit. The $s$ segment represents the recoil of the bolt alone under the influence of the accelerator and the retardation by the bolt driving spring. Since the slopes of these two portions of the recoil half of the curve are different, they represent unequal velocities and a knee is produced which includes the transition point $t$. A more desirable operation of the gun occurs when the bolt has a more uniform velocity and acceleration. Virtual elimination of the knee from the recoil half of the cycle will improve operation. One manner of accomplishing this will be mentioned subsequently.

The counterrecoil portion of curve A occupies a greater time interval than does the recoil section thereby indicating that the time consumed in counterrecoil is greater than that in recoil. A change in slope in the counterrecoil half of the curve is indicated by the knee at the transition point $t'$ and the flattened portion $r'$. A more desirable condition exists when the slope of $r'$ approximates that of $s'$. Speeding up the rate of fire will aid in accomplishing this.

When a conventional auxiliary or booster feed mechanism is employed with a machine gun of the Browning type, a bolt displacement-time curve similar to the B curve is characteristic of such an organization. The recoil portion of the curve is unaffected but it will be noticed that the counterrecoil period is shortened. An increased rate of fire as compared with the standard gun will result since the belt load on the gun feed mechanism, which feeds on counterrecoil, is reduced. However, the conventional booster feed is customarily associated with the gun and its belt in such a manner that a considerable load exists on the standard gun feed mechanism which derives all of its feeding force from the energy stored in the bolt and the bolt driving spring. Since the space limitations of the gun determine the size and strength of the bolt driving spring, it is highly desirable to reduce to a minimum the feeding load on this spring.

This is successfully accomplished by having the auxiliary feed mechanism lift the heavy belt load on recoil and associating this mechanism with the gun in such a manner that the load on the standard feed mechanism of the gun, which operates on counterrecoil, is at a minimum. Since tremendous energy is available in the recoiling barrel (a direct power source) and much is ordinarily dissipated, this wasted energy can be utilized to lift the heavy belt load. Only a small fraction of this available energy in the recoiling barrel is necessary to move a heavy belt, and the proper utilization of this energy can be employed to increase the efficiency and the rate of fire of the gun. This is achieved by coupling the booster feed directly to the recoiling barrel or barrel extension immediately adjacent the belt feed passage in the gun so as to provide a dual feed mechanism which is integral with the gun structure and independent of all external and often unreliable power sources. As will be shown and described in another part of the specification, arrangements are provided wherein the load on the conventional feed mechanism comprises but a few cartridges, and hence a negligible load for the standard bolt driving spring. This enables the bolt and associated feed mechanism to operate at practically no-load conditions and at a uniform and higher velocity thereby materially increasing the rate of fire.

Curve C illustrates the bolt displacement-time curve of a gun embodying the present invention. Since the belt load is included within the recoil portion of curve C, the curve will be somewhat flatter than the corresponding portion of curve A and it will reach its crest slightly later. This indicates the recoil period is a bit longer than that for a standard machine gun which does not incorporate the present power feed device. However, since the bolt is permitted to operate in counterrecoil under practically no-load conditions, the slope of the counterrecoil half of this curve will be appreciably steeper. This indicates a greater velocity and hence the consumption of a considerably smaller interval of time to feed a new cartridge to the receiver and for the gun to get back in battery. Since the counterrecoil period has been materially reduced, the time consumed for the entire cycle will be diminished thereby achieving a substantial increase in the rate of fire over that for guns including dual feed mechanisms of the prior art. The increased speed of operation virtually eliminates the knee which customarily appears in the counterrecoil portion of a bolt displacement-time curve.

When a barrel accelerator 9 (shown diagrammatically in Fig. 16) is employed on the muzzle end of the barrel 10 of a Browning machine gun which is provided with the instant dual feed mechanism, a bolt displacement-time curve similar to curve D is obtained. The accelerator or muzzle booster imparts added momentum to the recoiling barrel by increasing the velocity of recoil. This added energy can be used to move a greater belt load but is far more useful in smoothing out the knee in the recoil half of the curve and in reducing materially the recoil period. The action of the buffer mechanism on the faster recoiling interlock barrel, barrel extension and bolt is such that less relative velocity is imparted to the bolt through the accelerator after the interlocked assembly comes to rest. Therefore, the knee of the curve is virtually eliminated. As a result of the faster recoil of the barrel, the crest of the curve is reached sooner resulting in its displacement to the left of the other curves as shown in Fig. 1. Hence the barrel accelerator improves and shortens the recoil portion of the curve while the dual feed mechanism improves and shortens the counterrecoil half of the curve. Their combined effect is to materially shorten the time cycle between rounds and hence increase the rate of fire. The muzzle booster, by eliminating the knee in the recoil portion of the curve, provides a more uniform velocity and acceleration of the bolt and reduces to a minimum the impact forces delivered to the frame of the gun. The combined result is that the .50 cal. gun is able to operate smoothly at a rate of about 1200 rounds per minute.

The addition of momentum to the barrel at the time of recoil of the interlocked barrel, barrel extension, and bolt is most desirable as may be noted from an examination of curves A, B, and C of Fig. 1. Since the slope of the curves represents velocity, an increase in momentum through the use of a barrel accelerator is most advantageous since this is the low velocity part of the curve.

The incorporation of the auxiliary feed mechanism and the barrel accelerator, if the latter is desired, into the standard gun permits the gun to be timed more perfectly, the rate of fire is increased, and less stress is placed on the feeding and timing elements of the gun. All outside sources of power to assist in the feeding of the belt are eliminated. This insures reliability of functioning since the booster feed mechanism fails to operate only when the gun fails to fire. The compactness of this self-contained power feed unit and machine gun will be made obvious in a succeeding portion of the specification. In brief it may be stated that the instant booster feed utilizes a portion of the wasted energy of the recoiling barrel for power feed purposes, speeds up the rate of fire, and in addition permits a more accurate regulation of the feeding and timing of the gun independently of the bolt. Since the power feed stroke is derived entirely from the recoil of the barrel, the belt power lift will be independent of the elevation of the gun and also the gun frame recoil. This is because the recoil stroke of the barrel is constant in length and does not vary with the elevation of the gun.

While the present trend is toward guns having a higher rate of fire, it is to be understood that the instant power feed arrangement is suited for use with low speed as well as high speed guns. A smooth operating low speed gun is made possible since the belt retardation on the bolt is overcome. The velocity of recoil of the barrel can be reduced by adding barrel weight and also by the omission of a recoil booster thereby creating a low speed gun.

Referring to Fig. 5, there is represented a transverse section through an automatic gun which is provided with a barrel 10 arranged to reciprocate within certain limits in a trunnion block 11. This barrel constitutes the main power source or the primary driving member of the gun. A pair of side plates 12 are fastened to the trunnion block by suitable means such as rivets (not shown). Positioned above the barrel are the conventional cartridge feed passage 13, the belt feed slide 14, its associated belt feed pawl 15, and the belt holding pawl 16. Resting against the right-hand side plate 12 of the gun is a substantially flat base plate 17 which is secured to the gun by a bolt and nut arrangement 18—18'; see also Figs. 4 and 6. Bolt 18 passes through aligned holes 19—19 in the side plates and the depending legs 20 of the trunnion block 11 so that the reciprocating of the gun barrel will not be impeded. The head of the bolt 18 is arranged to rest in a countersunk or recessed seat 21 in the body plate 17. As shown in Fig. 4 a pair of bores 22 are provided in the upper and lower edges adjacent the left end of the base plate 17. One of these is arranged to receive a dowel pin 23 which is carried by the usual belt holding pawl pin 24 on the gun. A hole 25 is provided in the dowel through which the pin 24 is thrust. This pin and bore arrangement promotes a quick alignment of the base plate on the side of the gun during the assembling operation.

The front face of the base plate 17 is provided with a recessed guideway 26 which receives a reciprocating power feed slide 27. The guideway 26 is undercut on the side portions 28 (Fig. 8) to produce a pair of vertical flanges 29 which confine the power feed slide 27 in the channel during its reciprocatory movement. Intermediate the top and bottom edges of the base plate and adjacent the left end thereof is a bore 30 having a recessed seat 31 that is adapted to receive a set screw 32 which acts as a pivot for a bell crank lever 33. The threaded end 34 of the set screw is retained in a complementary threaded bore (not shown) in the side plate 12 of the gun. The other side plate of the automatic weapon carries a similarly disposed bore for a purpose which will be explained hereinafter. The back face of the base plate 17 is conditioned with a generally triangular shaped recess or cut-out portion 35 which permits an arm 36 of the bell crank 33 that is coupled to the power feed slide 27 to oscillate therein; see Figs. 4, 5 and 8. Arm 36 has an elongated aperture 37 which receives a cylindrical stud 38 threaded into the rear of the power feed slide 27 to effect a pivotal coupling between those two members. Aperture 37 is oval in shape with the major axis disposed substantially horizontally to compensate for the arcuate movement of the arm 36 when the power feed slide 27 is reciprocated vertically. The right-hand end of the base plate is provided with a pair of spaced lugs 39 which have aligned bores 40. These act as hinge elements and receive a pin 41 which is arranged to secure a cartridge guide 42 thereto in the manner illustrated in Figs. 2 and 3. The left end of the base plate 17 has a single lug 43 with a vertically disposed hole 44 and constitutes one of the lock elements for the cartridge guide 42 as will be explained in more detail later.

Power feed slide 27 is a substantially U-shaped member as represented in Figs. 4 and 8 and is adapted to reciprocate in its guide channel 26. Parallel side walls 45 journal a pawl pin 46 which carries a power feed pawl 47 in pivotal engagement thereon. A spring 48 is coiled about a portion of the shaft to yieldingly urge the pawl outwardly in a cartridge engaging relationship as is shown more clearly in Fig. 5.

The upper arm of the bell crank lever 33 is conditioned with a countersunk aperture 33' and is secured to a connecting rod 49 by a flat headed pivot pin 50 which passes through the aperture and is retained in position by suitable means such as a cotter pin 51; see Figs. 3, 4 and 11. The connecting rod extends alongside the side plate 12 of the gun and is coupled at its lower end to the barrel extension 52 of the gun by a pin 53; (see Figs. 2, 3 and 11). The headed end of the pin extends through an elongated slot 54 in the right hand side plate 12 of the gun and the pin reciprocates therein concurrently with the movements of the barrel extension 52 in recoil and counterrecoil. Pin 53 is press fitted in a bore 55 which extends transversely through the barrel extension. A second slot 54' appears in the left-hand side plate 12 so as to permit the pin 53 and connecting rod 49 to be mounted on the opposite side of the gun in an instance which will be subsequently mentioned. An outwardly bowed bracket 56 is secured to the side plate of the gun by a pair of set screws 57 which are fastened in threaded recesses 58. Similarly positioned recesses appear in the opposite side of the gun. Bracket 56 functions as a guide for one end of the connecting rod.

Cartridge guide 42, which comprises a substantially U-shaped member (Fig. 9), is provided with a lug 59 that is centrally disposed on one end and has a bore 60 adapted to receive pin 41 thereby permitting pivotal mounting of the guide on the base plate 17. The opposite end carries a pair of attaching lugs 61 which are arranged to span lug 43, on the base plate 17. These lugs have aligned, pin receiving bores 62. When the guide plate 42 is swung closed as shown in Figs. 1 and 2, an expanding pin 63 can be inserted so as to lock the members together. In this position the guide 42 and the base plate 17 define a passageway substantially conforming to the shape of a cartridge as shown in Fig. 3. A pair of vertically extending ribs 64 and 65 on the base plate and the cartridge guide respectively serve as aligning means for the neck end of cartridges. The cartridge guide is preferably flared at its top and bottom to facilitate ingress and egress of a rapidly moving cartridge belt. Midway between the top and bottom edges of the cartridge guide are a pair of rectangular holes 66—66 (Figs. 2 and 5) which are separated by a web portion 67. A pair of spaced brackets 68 are mounted adjacent the web portion and journal a pin 69 which carries a spring pressed holding pawl 70. Coil spring 71 is arranged to urge the cartridge engaging end 72 through the upper of the pair of holes 66—66. A cotter pin 73 prevents the pawl pin 69 from working out of its bracket supports. The purpose of the lower hole 66 will be subsequently elucidated.

When it is desired to convert the gun to a left hand feed, the pin 53 is driven out of its bores in the barrel extension 52. Bowed bracket 56 is removed by backing off screws 57. By swinging open the cartridge guide 42 on its hinges, the bolt and nut fastener 18—18' and the set screw 32 may be removed, thereby permitting the base plate 17 to be detached from the side of the gun and from engagement with dowel pin 23.

The feed mechanism on the gun is then converted to a left-hand feed as follows. Dowel pin 23 is slipped over the belt holding pawl pin 24 on the left side of the gun. Base plate 17 is then secured to the gun by inverting it and slipping bolt 18 through from left to right and tightening nut 18'. This is possible since the plate is symmetrical about a horizontal line through the bore for bolt 18 and also because of the second bore 22 in one edge of the plate. Pin 50 is removed thereby disconnecting the connecting rod 49 from bell crank lever 33. The connecting rod is turned over and coupled to the bell crank by pin 50. The opposite end of the connecting rod is then secured to the left side of the barrel by driving pin 53 into bore 55. Bracket 56 is attached to the left side plate of the gun by tightening screws 57 into the recesses provided therein. The bell crank is then secured to the base plate by pivot pin 32 and the power feed slide 27 is inverted in its guideway and coupled to the bell crank. Since the holding pawl 70 on the cartridge guide is up-side-down, it must be inverted so as to project through the other of the two holes 66. This is accomplished by removing pin 69 from the brackets 68 and reversing the pawl. Pins 63 and 41 are preferably inverted in the ends of the cartridge guide although this is not absolutely necessary. The gun is now conditioned for a left-hand feed. It will be observed that this transposition is effected by the use of but a few simple tools.

The operation of the power feed mechanism (set for right hand feed) in conjunction with the gun is as follows. First a cartridge belt is threaded through the power feed mechanism into the standard feed mechanism and in the general manner shown in Fig. 5. When the gun is fired the barrel 10 and the barrel extension 52 recoil in the fixed trunnion block 11. This backward movement (to the left in Figs. 2-4) of the barrel extension pulls pin 53 toward the rear of slot 54 and acting through the connecting rod 49 rocks the bell crank 33 about its pivot pin 32. This lifts arm 36 of the bell crank and elevates the power feed slide 27 and its associated feed pawl 47 in the guide channel 26. Power feed pawl 47 engages behind a cartridge in the cartridge guide and carries the belt upwardly. Holding pawl 70 ratchets over the oncoming cartridge. The movement of the power feed slide is sufficient to lift a new cartridge above the holding pawl and to provide a loop or bight in the cartridge belt as shown in phantom and designated as A in Fig. 5. The creation of this bight constitutes an important feature of the invention as will be mentioned shortly. Slide 27 is provided with a little overthrow so that it actually feeds a distance slightly greater than the normal pitch distance between a pair of cartridges in the links. This is to compensate for any dimensional irregularities in the clips or belt sections and to allow for the stretch which occurs in a belt of considerable length. When the slide is lowered (as will be described subsequently) the belt drops back slightly and is held against retrograde movement by the holding pawl 70 which engages behind a previously advanced cartridge. The flared exit in the cartridge guide enables its adjacent cartridge belt section to assume the shape of a loose, untensioned bight. It will be observed that the angular disposition of the power feed slide with respect to the conventional feed slide on the gun promotes the formation of a bight in the flexible cartridge belt.

While Fig. 5 illustrates a comparatively small bight or loop, the cartridge belt may be threaded to the gun so that a slightly larger loop of cartridges is available above the power feed holding pawl 70.

During recoil of the gun, the conventional feed slide 14 of the gun is advancing to the right (Fig. 5) preparatory to picking up a new cartridge. Holding pawl 16 functions in its customary manner. On counterrecoil the barrel 10 and barrel extension come back in battery and the connecting rod 49 and bell crank 33 are returned to the positions illustrated in Figs. 2 and 4. The power feed slide and pawl assume the position shown in Fig. 4.

During counterrecoil of the gun, the standard feed mechanism operates to feed a new cartridge to the receiver. Feed slide 14 and the feed pawl 15 of the gun move to the left (Fig. 5) and advance a small section of the belt to present a new cartridge to the receiver. The load on the conventional feed slide is almost a negligible one since it comprises the belt section between the feed pawl 15 of the gun and the holding pawl 70 of the auxiliary feed mechanism. The presence of the bight A above the holding pawl 70 of the power feed mechanism eliminates any tension in the belt in the immediate vicinity of the cartridge feed passage of the gun and insures a free and easy delivery of ammunition to the gun. This permits the conventional timed feed mechanism of the gun to function at all times at a high and uniform rate of speed. The length and weight of the entire belt is no longer a factor affecting the speed of operation. As shown in Fig. 5 the load consists of five cartridges. The feed stroke of the slide 14 takes the slack or bight out of the belt section above the holding pawl 70. When the gun is fired again, recoil introduces a bight A in the belt in the manner previously mentioned and counterrecoil feeds a cartridge to the receiver and removes the slack above the holding pawl 70.

It is often desirable to feed a cartridge belt from a location substantially on the same level as the conventional feed mechanism of the Browning automatic rifle. Figs. 12-14 illustrate a power feed mechanism which is adapted to advance a belt from such a location to the standard gun feed mechanism. The device includes a substantially right-angular bracket structure 74 which has one of its flanges 75 secured to the side plate 12 of the gun by four set screws 76. The outer end of the bracket has a horizontal sleeve 77 which provides a feed passage 78 which is aligned with the feed passage 13 in the gun. The top face of the sleeve 77 has pivotally mounted thereon and partially projecting through an aperture therein a holding pawl 79 which is normally sustained in a cartridge engaging position by a spring 80. The lower inner surface 81 of the sleeve 77 acts as a shelf and slidably retains a power feed slide 82 which is adapted to reciprocate thereon. The power feed slide carries a spring pressed, pivotally mounted power feed pawl 83 which projects through a narrow elongated hole 84 in bracket 74 and advances the cartridge belt when the slide is reciprocated. The inner end of this slide is provided with a sleeve 85 with a bearing surface having the general shape of an elliptical cylinder. This journal is adapted to receive the cylindrical end 86 of a bell crank lever 87. This lever is provided with a hollow hub 88 which is pivotally mounted on a vertically disposed pin 89 which is journalled in the bracket structure 74 at one side thereof. An enlarged head 90 retains the upper end of the pin in the bracket while the lower end carries an expanding pin 91 in a suitable transverse bore thereby locking this assembly in position. The other arm 92 of the bell crank 87 extends toward the side of the gun and has a rounded end 93 which is arranged to fit in a notch or recess 94 in the barrel extension 52 of the gun.

The sleeve 77 is flared at its ends 95 and 96 to promote the ingress and egress of the cartridge belt. The bracket 74 is provided with an arcuate hump or deflector 97 adjacent the flared mouth 95 of the sleeve for a purpose which will be subsequently mentioned. The hump is disposed transversely of the bracket and substantially parallel to the axis of an approaching cartridge. Secured to the bracket 74 is an upwardly bent leaf spring 98 which lies substantially in the path of a cartridge belt which is to be fed into the conventional feed passage 13 of the gun.

This power feed mechanism requires but a few simple modifications in a standard machine gun to permit its attachment thereto. Fig. 15 illustrates the portion of the gun that the power feed mechanism is secured to. Four holes 99 are drilled and threaded in the side plate 12 of the gun to receive the four set screws 76 which hold the bracket 74 on the gun. An elongated slot 100 is cut in the side plate, and in back of the slot the recess 94 is cut in the barrel extension 52 to receive the rounded end 93 of the arm 92 of the bell crank. These five comparatively simple machining operations are all that are required to condition the standard gun to receive the side feeding power feed mechanism.

The operation of this auxiliary feed mechanism is as follows: When the gun is fired the barrel 10 and the barrel extension 52 recoil in the fixed trunnion block. As shown in Fig. 12 the movement of these members in recoil is to the right. Bell crank 87 is effectively coupled to the barrel extension and moves therewith since its end 93 is lodged in recess 94. Hence recoil of the gun barrel rocks the bell crank thereby permitting the arm coupled to the power feed slide 82 to move the slide in its guideway in bracket 74 toward the axis of the gun barrel. In so doing the power feed pawl 83 on the slide engages behind a cartridge in the belt and advances the entire belt a distance equal to the pitch distance between links. The holding pawl 79 ratchets over a cartridge which is being advanced and then drops behind it to prevent backward movement of the belt.

The operation of the power feed mechanism in conjunction with the conventional feed mechanism of the gun may be best understood by referring to Fig. 14. As the power feed slide moves toward the axis of the gun, the power feed pawl 83 introduces a loop or bight shown generally at B in the cartridge belt. This bight produces slack between the holding pawl 16 on the gun and region of the deflector 97 and the holding pawl 79 on the power feed mechanism. Deflector 97 performs a special mission at this time. The deflector directs the adjacent section of the belt upwardly thereby assisting in the creation of the bight B. Since the power feed slide in its feeding movement is capable of exerting an exceptionally strong force, this force should not be applied as a direct thrust against the stop mechanism in the feed passage of the gun. Such a force could be transmitted through a substantially flat section of the cartridge belt. Damage would result which would seriously impair the operation of the gun or put it out of service. The presence of the flexible bight in the cartridge belt prevents any injurious pressure on the stop elements in the feed passage and avoids the above mentioned dangers. If the gun should happen to be operated from an inverted position, gravity acting on the belt and the flared mouth 95 on the sleeve 77 will facilitate the formation of the bight B. During the recoil interval, the conventional feed slide on the gun is moved to the right as viewed in Fig. 14 to permit the gun feed pawl 15 to engage behind a new cartridge which is to be fed into the receiver of the gun. Holding pawl 16 prevents any retrograde movement of the belt.

On counterrecoil, the movement of the barrel 10 and barrel extension 52 into battery rocks the bell crank lever 87 so that the power feed pawl 83 is ratcheted back to the position illustrated in Fig. 14. During counterrecoil the conventional feed mechanism on the gun pulls the belt toward the receiver to present a new cartridge thereat. This movement flattens the uplifted bight with such rapidity that this section of the belt would ordinarily slap against the bracket 74 with considerable momentum. The upwardly bent leaf spring 98 is interposed between the belt section and the upper face of the bracket 74 to absorb the shock load. This reduces vibration and steadies the gun. When the gun returns to battery it is fired again and the previously described cycle of operations is repeated. The bight illustrated in Fig. 14 is merely representative and may be slightly larger if desired.

While a bell crank arrangement has been described as the means for coupling the barrel extension to the power feed slide for actuating the slide, other mechanical organizations are feasible and will suggest themselves to one skilled in the art. In Fig. 17 the lower part of the barrel extension 52 is conditioned to provide a rack 99 which engages a spur gear 100 rotatably mounted about its axis 101 in the frame of the gun. A lever arm 102 is coupled to the gear and a feed slide 103 whereby axial reciprocation of the barrel extension will raise and lower the power feed slide.

A similar arrangement is illustrated diagrammatically in Fig. 18 and is adapted for optional right or left hand feed slide 103 reciprocates in a horizontal plane as in the device shown in Fig. 12. The barrel extension 52 has a pair of racks 99 in opposite vertical sides. A spur gear 100 is arranged for mounting in the frame on either side of the gun and imparts transverse motion to the slide 103 through lever arm 102 when the barrel extension reciprocates.

It has been found that the time of the impulse of the auxiliary feed mechanism acting on the heavy belt is so short as to give rise to a very large reactive force which may damage the belt linkage. According to a modified form of the invention the time of the impulse is lengthened by provision of a resilient coupling, the time, of course, remaining less than the reciprocal of the frequency of feed.

The Figures 19 to 24 show a modified form of an auxiliary feed mechanism substantially as disclosed above except for the resilient coupling in the line of thrust to the feeding pawl.

Referring to Figure 20, there is represented a transverse section through an automatic gun which is provided with a barrel 10 arranged to reciprocate within certain limits in a trunnion block 11. This barrel constitutes the main power source or the primary driving member of the gun. A pair of side plates 12 are fastened to the trunnion block by suitable means such as rivets (not shown). Positioned above the barrel are the conventional cartridge feed passage 13, the belt feed slide 14, its associated belt feed pawl 15, and the belt holding pawl 16. Resting against the right-hand side plate 12 of the gun is a substantially flat base plate 17 which is secured to the gun by a bolt and nut arrangement 18—18'; (see also Figures 19 and 21). Bolt 18 passes through aligned holes in the side plates and the depending legs 20 of the trunnion block 11 so that the reciprocation of the gun barrel will not be impeded. The head of the bolt 18 is arranged to rest in a countersunk or recessed seat 21 in the body plate 17.

As shown in Figure 19 a pair of bores 22 are provided in the upper and lower edges adjacent the left end of the base plate 17. One of these is arranged to receive a dowel pin 23 which is carried by the usual belt holding pawl pin 24 on the gun. A hole 25 is provided in the dowel through which the pin 24 is thrust. This pin and bore arrangement promotes a quick alignment of the base plate on the side of the gun during the assembling operation.

The front face of the base plate 17 is provided with a recessed guideway 26 which receives a reciprocating power feed slide 27. The guideway 26 is undercut on the side portions 28 (Fig. 21) to produce a pair of vertical flanges 29 which confine the power feed slide 27 in the channel during its reciprocatory movement. Intermediate the top and bottom edges of the base plate and adjacent the left end thereof is a bore 30 having a recessed seat 31 that is adapted to receive a set screw 32 which acts as a pivot for a bell crank lever 33b. The threaded end 34 of the set screw is retained in a complementary threaded bore (not shown) in the side plate 12 of the gun. The other side plate of the automatic weapon carries a similarly disposed bore for a purpose which will be explained hereinafter. The back face of the base plate 17 is conditioned with a generally triangular shaped recess or cut-out portion 35 which permits an arm 36 of the bell crank 33 that is coupled to the power feed slide 27 to oscillate therein; (see Figs. 19, 20 and 21). Arm 36 has an elongated aperture 37 which receives a cylindrical stud 38 threaded into the rear of the power feed slide 27 to effect a pivotal coupling between those two members. Aperture 37 is oval in shape with the major axis disposed substantially horizontally to compensate for the arcuate movement of the arm 36 when the power feed slide 27 is reciprocated vertically.

In this modified form a resilient coupling is interposed between the bell crank lever 33 and the power feed slide 27 to lessen the impact of recoil transmitted to the feed slide during firing of the gun. One form of resilient coupling is shown in Figures 19 to 22 inclusive comprising a helical spring 38a mounted in a recess 37a formed in an angular extension 36a of the bell crank lever arm 36. A screw threaded plug 38b is inserted in the outer end of the bore 37a to act as a seat for spring 38a and to provide means for adjusting the tension of the spring 38a.

The right-hand end of the base plate is provided with a pair of spaced lugs 39 which have aligned bores 40. These act as hinge elements and receive a pin 41 which is arranged to secure a cartridge guide 42 thereto in the manner illustrated in Fig. 20. The left end of the base plate 17 has a single lug 43 with a vertically disposed hole 44 and constitutes one of the lock elements for the cartridge guide 42 as will be explained in more detail later.

Power feed slide 27 is a substantially U-shaped member as represented in Figs. 20 and 21 and is adapted to reciprocate in its guide channel 26. Parallel side walls 45 journal a pawl pin 46 which carries a power feed pawl 47 in pivotal engagement thereon. A spring 48 is coiled about a portion of the shaft to yieldingly urge the pawl outwardly in a cartridge engaging relationship as is shown more clearly in Fig. 20.

The upper arm of the bell crank lever 33 is conditioned with a countersunk aperture 33' and is secured to a connecting rod 49 by a flat headed pivot pin 50 which passes through the aperture and is retained in position by suitable means such as a cotter pin 51. The connecting rod extends alongside the side plate 12 of the gun and is coupled at its lower end to the barrel extension 52 of the gun by a pin.

Cartridge guide 42, which comprises a substantially U-shaped member, is provided with a lug that is centrally disposed on one end and has a bore adapted to receive pin 41 thereby permitting pivotal mounting of the guide on the base plate 17. The opposite end carries a pair of attaching lugs which are arranged to span lug 43, on the base plate 17. These lugs have aligned, pin receiving bores. When the guide plate 42 is swung closed as shown in Fig. 20 an expanding pin 63 can be inserted in the bores so as to lock the members together. In this position the guide 42 and the base plate 17 define a passageway substantially conforming to the shape of a cartridge. A pair of vertically extending ribs 64 and 65 on the base plate and the cartridge guide respectively serve as aligning means for the neck end of cartridges. The cartridge guide is preferably flared at its top and bottom to facilitate ingress and egress of a rapidly moving cartridge belt. Midway between the top and bottom edges of the cartridge guide are a pair of rectangular holes 66—66 Fig. 20 which are separated by a web portion 67. A pair of spaced brackets 68 are mounted adjacent the web portion and journal a pin 69 which carries a spring pressed holding pawl 70. Coil spring 71 is arranged to urge the cartridge engaging end 72 through the upper of the pair of holes 66—66. A cotter pin (not shown) prevents the pawl pin 69 from working out of its bracket supports. The purpose of the lower hole 66 will be subsequently elucidated.

When it is desired to convert the gun to a left hand feed, the pin 63 is driven out of its bore in the lugs. By swinging open the cartridge guide 42 on its hinges, the bolt and nut fastener 18—18' and the set screw 32 may be removed, thereby permitting the base plate 17 to be detached from the side of the gun and from engagement with dowel pin 23.

The feed mechanism on the gun is then converted to a left-hand and dowel pin 23 is slipped over the belt holding pawl pin 24 on the left side of the gun. Base plate 17 is then secured to the gun by inverting it and slipping bolt 18 through from left to right and tightening nut 18'. This is possible since the plate is symmetrical about a horizontal line through the bore for bolt 18 and also because of the second bore 22 in one edge of the plate. Pin 50 is removed thereby disconnecting the connecting rod 49 from bell crank lever 33. The connecting rod is turned over and coupled to the bell crank by pin 50. The opposite end of the connecting rod is then secured to the left side of the barrel as disclosed hereinbefore. The bell crank is secured to the base plate by pivot pin 32 and the power feed slide 27 is inverted in its guideway and coupled to the bell crank. Since the holding pawl 70 on the cartridge guide is up-side-down, it must be inverted so as to project through the other of the two holes 66. This is accomplished by removing pin 69 from the brackets 68 and reversing the pawl. Pins 63 and 41 are preferably inverted in the ends of the cartridge guide although this is not absolutely necessary. The gun is now conditioned for a left-hand feed. It will be observed that this transposition is effected by the use of but a few simple tools.

The operation of the power feed mechanism (set for right hand feed) in conjunction with the gun is as follows. First a cartridge belt is threaded through the power feed mechanism into the standard feed mechanism and in the general manner shown in Fig. 20. When the gun is fired the barrel 10 and the barrel extension 52 recoil in the fixed trunnion block 11. This backward movement (to the left in Fig. 19) of the barrel extension acting through the connecting rod 49 rocks the bell crank 33 about its pivot pin 32. This lifts arm 36 of the bell crank and elevates the power feed slide 27 and its associated feed pawl 47 in the guide channel 26.

The end 36a of the bell crank moves at the same speed as the recoil of the barrel extension and associated parts and therefore the resilient coupling, above described, is connected between the bell crank and the power feed slide 27 to prevent damage to the belt linkage.

Power feed pawl 47 engages behind a cartridge in the cartridge guide and carries the belt upwardly. Holding pawl 70 ratchets over the oncoming cartridge. The movement of the power feed slide is sufficient to lift a new cartridge above the holding pawl and to provide a loop or bight in the cartridge belt as shown in phantom and designated as A in Fig. 20. The creation of this bight constitutes an important feature of the invention as has been fully described in the operation of the first form of this invention.

Figure 23:
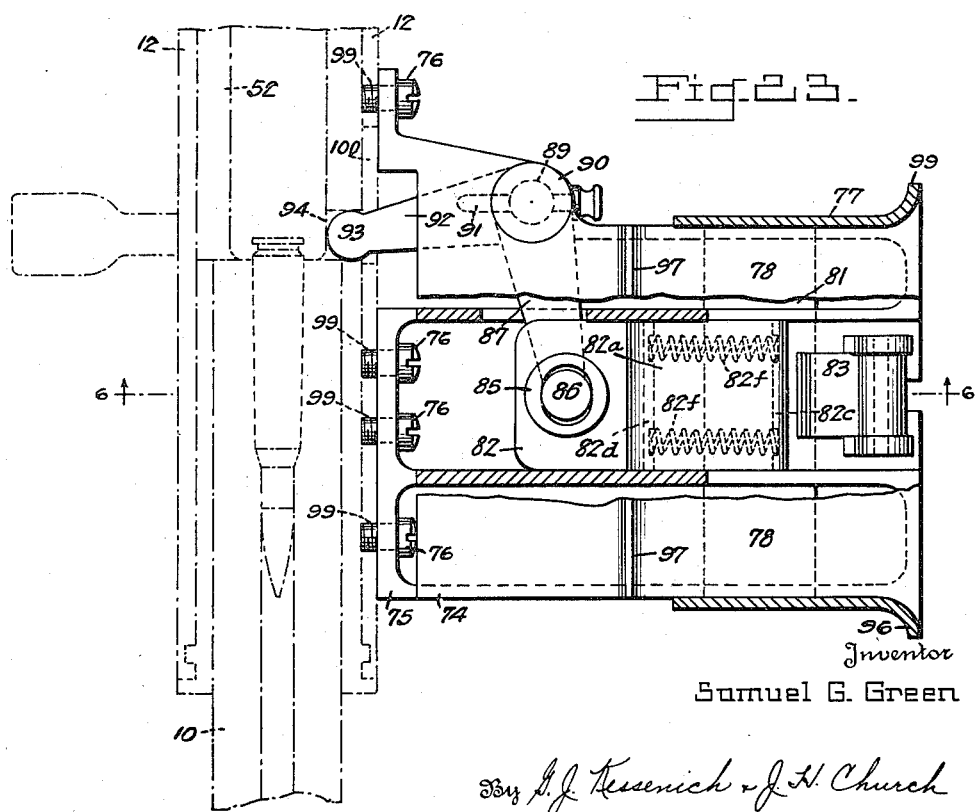
Fig. 23 is a top plan view of a modified auxiliary feed mechanism mounted on the left side of a machine gun.

It is often desirable to feed a cartridge belt from a location substantially on the same level as the conventional feed mechanism of the Browning automatic rifle. Figs. 23 and 24 illustrate a power feed mechanism which is adapted to advance a belt from such a location to the standard gun feed mechanism. The device includes a substantially right-angular bracket structure 74 which has one of its flanges 75 secured to the side plate 12 of the gun by four set screws 76. The outer end of the bracket has a horizontal sleeve 77 which provides a feed passage 78 which is aligned with the feed passage 13 in the gun. The top face of the sleeve 77 has pivotally mounted thereon and partially projecting through an aperture therein a holding pawl 79 which is normally sustained in a cartridge engaging position by a spring 80. The lower inner surface 81 of the sleeve 77 acts as a shelf and slidably retains a power feed slide 82 which is adapted to reciprocate thereon. The power feed slide carries a spring pressed, pivotally mounted power feed pawl 83 which projects through a narrow elongated hole 84 in bracket 74 and advances the cartridge belt when the slide is reciprocated. The inner end of this slide is provided with a sleeve 85 with a bearing surface having the general shape of an elliptical cylinder. This journal is adapted to receive the cylindrical end 86 of a bell crank lever 87.

In this modified form of the invention cushioned power feeding means between the recoil mechanism and the cartridge belt is built into the power feed slide 82. The slide 82 is formed of two overlapping sections 82a and 82b having angular ends 82c and 82d respectively, bent in opposite directions so that the overlapped portions provide a recess 82e for housing any number of helical springs 82f required to provide the proper cushioning of the thrust of the bell crank lever while said thrust is being transmitted to the power feed pawl 83. On counterrecoil this structure does not interfere with the return of the power feed pawl 83 to engage the next cartridge.

A lever 87 is provided with a hollow hub 88 which is pivotally mounted on a vertically disposed pin 89 which is journalled in the bracket structure 74 at one side thereof. An enlarged head 90 retains the upper end of the pin in the bracket while the lower end carries an expanding pin 91 in a suitable transverse bore thereby locking this assembly in position. The other arm 92 of the bell crank 87 extends toward the side of the gun and has a rounded end 93 which is arranged to fit in a notch or recess 94 in the barrel extension 52 of the gun.

The sleeve 77 is flared at its ends 95 and 96 to promote the ingress and egress of the cartridge belt. The bracket 74 is provided with an arcuate hump or deflector 97 adjacent the flared mouth 95 of the sleeve for a purpose which will be subsequently mentioned. The hump is disposed transversely of the bracket and substantially parallel to the axis of an approaching cartridge. Secured to the bracket 74 is an upwardly bent leaf spring 98 which lies substantially in the path of a cartridge belt which is to be fed into the conventional feed passage 13 of the gun.

This power feed mechanism requires but a few simple modifications in a standard machine gun to permit its attachment thereto. Four holes 99 are drilled and threaded in the side plate 12 of the gun to receive the four set screws 76 which hold the bracket 74 on the gun. An elongated slot 100 is cut in the side plate 12, and in back of the slot the recess 94 is cut in the barrel extension 52 to receive the rounded end 93 of the arm 92 of the bell crank. These five comparatively simple machining operations are all that are required to condition the standard gun to receive the side feeding power feed mechanism.

The operation of this auxiliary feed mechanism is as follows:

When the gun is fired the barrel 10 and the barrel extension 52 recoil in the fixed trunnion block. Bell crank 87 is effectively coupled to the barrel extension and moves therewith since its end 93 is lodged in recess 94. Hence recoil of the gun barrel rocks the bell crank thereby permitting the arm coupled to the power feed slide 82 to move the slide in its guideway in bracket 74 toward the axis of the gun barrel. In so doing the power feed pawl 83 on the slide engages behind a cartridge in the belt advances the entire belt a distance equal to the pitch distance between links. The holding pawl 79 ratchets over a cartridge which is being advanced and then drops behind it to prevent backward movement of the belt.

The operation of the power feed mechanism in conjunction with the conventional feed mechanism of the gun may be best understood by referring to Fig. 24. As the power feed slide moves toward the axis of the gun, the power feed pawl 83 introduces a loop or bight shown generally at B in the cartridge belt. This bight produces slack between the holding pawl 16 on the gun and region of the deflector 97 and the holding pawl 79 on the power feed mechanism. Deflector 97 performs a special mission at this time. The deflector directs the adjacent section of the belt upwardly thereby assisting in the creation of the bight B. Since the power feed slide in its feeding movement is capable of exerting an exceptionally strong force, this force should not be applied as a direct thrust against the stop mechanism in the feed passage of the gun. Such a force could be transmitted through a substantially flat section of the cartridge belt. Damage would result which would seriously impair the operation of the gun or put it out of service. The presence of the flexible bight in the cartridge belt prevents any injurious pressure on the stop elements in the feed passage and avoids the above mentioned dangers. The presence of a resilient or cushioning element in power feed slide prevents a violent thrust on the feed pawl 83 and consequently on the cartridge belt, or otherwise stated, it lengthens the time of impact. If the gun should happen to be operated from an inverted position, gravity acting on the belt and the flared mouth, 95 on the sleeve 77 will facilitate the formation of the bight B.

During the recoil interval, the conventional feed slide on the gun is moved to the right as viewed in Fig. 24 to permit the gun feed pawl 15 to engage behind a new cartridge which is to be fed into the receiver of the gun. Holding pawl 16 prevents any retrograde movement of the belt.

While a bell crank arrangement has been described as the means for coupling the barrel extension to the power feed slide for actuating the slide, other mechanical organizations are feasible and will suggest themselves to one skilled in the art.

While the invention has been represented and described in connection with the recoiling barrel and barrel extension of a Browning machine gun, it is to be understood that it is capable of a similar association with the gas piston of a gas operated gun. The gas piston constitutes the direct power source and imparts ample force to the power feed mechanism to lift the heavy belt to the final feeding stage for the conventional feed to engage it for operation under no burden.

I claim:

1. In combination with a machine gun having a frame including a feed passage, a barrel, a barrel extension and a bolt reciprocable in the frame during gun firing, a main belt feeding device coupled to the bolt and reciprocable in the top portion of the frame transversely of the axis of the gun, said main feeding device constructed and arranged to feed the first cartridges in the leading end of a belt on counterrecoil, a holding pawl in the frame for the leading end of the belt for preventing retrograde movement thereof; the improvement consisting of an auxiliary belt feed comprising a member fixed with relation to the gun frame and having a guideway, a feed slide reciprocable in the guideway, a cartridge belt guide on said fixed member, a cartridge belt feed pawl carried by the feed slide and extending into said cartridge belt guide, a second holding pawl in said guide, a lever pivotally attached to a fixed part of the gun frame, means pivotally connecting said lever to the said slide, operative connections between said lever and said barrel extension constructed and arranged to operate the feed slide upon the recoil of the barrel extension, and resilient means interposed between said lever and the feed slide to lessen the impact of recoil on said slide upon the firing of the gun.

2. In combination with a machine gun having a frame including a feed passage, a barrel, a barrel extension and a bolt reciprocable in the frame during gun firing, a main belt feeding device coupled to the bolt and reciprocable in the top portion of the frame transversely of the axis of the gun, said main feeding device constructed and arranged to feed the first few cartridges in the leading end of a belt on counterrecoil, and a holding pawl on the frame for the leading end of the belt for preventing retrograde movement thereof; the improvement consisting of an auxiliary belt feed comprising a member fixed with relation to the gun frame and having a guideway, a feed slide reciprocable in the guideway, a cartridge belt guide on said fixed member, a cartridge feed pawl carried by the feed slide and extending into said cartridge belt guide, a second cartridge belt holding pawl in said guide, a lever pivoted to said fixed member and having an arm connected with the said slide, and resilient means interposed between said arm and feed slide to lessen the impact on said slide and said pawl during the cartridge feeding operation, the lever also having an arm attached to the gun barrel extension and so constructed and arranged to move the slide to feed the belt upon recoil of the gun barrel.

3. The invention of claim 1 characterized in that the lever is a bell crank having a hollow extension, an adjustable plug closing the end of the extension, said connecting means comprising a pivot pin fixed to said slide and extending into said hollow extension, said resilient means comprising a spring in the hollow extension extending between the pivot pin and the plug, the plug providing means for varying the compression of the spring.

4. In combination with a machine gun having a frame including a feed passage arranged transversely of the gun, a barrel, a barrel extension and a bolt reciprocable in the frame during gun firing, a main feeding device coupled to the bolt and reciprocable in the top portion of the frame transversely of the axis of the gun, said main feeding device arranged to feed the first few cartridges in the leading end of a belt on counterrecoil, and a holding pawl on the frame for the leading end of the belt for preventing retrograde movement thereof; the improvement comprising a bracket secured to a side of the frame, a guide means on said bracket and forming a belt passage aligned with the feed passage in the gun frame and spaced therefrom, a second belt feeding device reciprocably mounted in the guide means, a bell crank pivotally mounted on the bracket and coupled at one end to the barrel extension, a shock absorbing element coupling said bell crank to the second belt feeding device, said bell crank constructed and arranged to operate said second feeding device to advance the belt on recoil of the barrel extension, a second holding pawl on said guide means projecting into the belt passage, a cartridge deflecting rib in said belt passage between said main feeding device and said second feeding device for deflecting the cartridge of the belt out of the line of belt feed, and a leaf spring secured to said belt passage between the deflecting rib and the main feeding device to cushion the deflected cartridges during the feeding of the belt by said main feeding device upon counterrecoil.

5. In combination with a machine gun having a frame including a feed passage arranged transversely of the gun, a barrel, a barrel extension and a bolt reciprocable in the frame during gun firing, a main feeding device coupled to the bolt and reciprocable in the top portion of the frame transversely of the axis of the gun, said main feeding device arranged to feed the first few cartridges in the leading end of a belt on counterrecoil, and a holding pawl on the frame for the leading end of the belt for preventing retrograde movement thereof; the improvement comprising a bracket secured to a side of the frame, a guide means on said bracket and forming a belt passage aligned with the feed passage in the gun frame and spaced therefrom, a second belt feeding device reciprocably mounted in the guide means, a bell crank pivotally mounted on the bracket and coupled at one end to the barrel extension, a shock absorbing element coupling said bell crank to the second belt feeding device, a bell crank constructed and arranged to operate said second feeding device to advance the belt on recoil of the barrel extension, a second holding pawl on said guide means projecting into the belt passage, a cartridge deflecting rib in said belt passage between said main feeding device and said second feeding device and spaced from the holding pawl on the frame for deflecting the cartridges of the belt out of the line of belt feed, and a leaf spring secured to said belt passage between the deflecting rib and the main feeding device to cushion the deflected cartridges during the feeding of the belt by said main feeding device upon counterrecoil.

6. In combination with a machine gun having a frame including a feed passage, a barrel and barrel extension and a bolt reciprocable in the frame during gun firing, a main belt feeding device coupled to the bolt and reciprocable in the top portion of the frame transversely of the axis of the gun, said main feeding device constructed and arranged to feed the first few cartridges in the leading end of a belt on counterrecoil, and a holding pawl on the frame for the leading end of the belt for preventing retrograde movement thereof; the improvement consisting of an auxiliary belt feed comprising a base plate secured to the gun frame and provided with a feed slider guideway, a feed slider reciprocable in said guideway, a feed pawl pivoted in said slider, a belt guide opposite the feed slider guide and having a holding pawl pivoted therein above said feed pawl, a two-arm lever pivotally mounted adjacent one of the plates of the gun frame and having one arm connected with the feed slide and the other with the barrel for operating said lever to operate the feed slide to lift the weight of the belt below said feed pawl upon recoil of the barrel, said feed pawl and holding pawl of the auxiliary feed being so coordinated with the feeding pawl of the main feeding device as to occasion a slack in the belt between the holding pawl of the auxiliary feed and the feeding pawl of the main feeding device.

7. In combination with a machine gun having a frame comprising two side plates having a pair of oppositely disposed elongated guide slots therein and a main feed mechanism operable upon counterrecoil of the gun, the improvement comprising an auxiliary feed comprising a base plate rigidly disposed on one of said side plates and having a feed slider guideway therein, a pin rigidly connecting said base plate to the said frame and passing through both of said side plates, a feed slider reciprocable in said guideway and having a feed pawl pivoted thereto, a bell crank pivotally mounted on one of the side plates and coupled at one of its ends to the feed slider, a connecting rod pivotally connected to the other end of said lever, said rod having a pin extending transversely of the gun frame and attached to the barrel extension whereby the slider is operated to operate the feed slider upon the recoil of the barrel, the end portions of said pins being adapted to ride in the said slots in the side plates, a cartridge guide mounted on the base plate, said plate and cartridge guide forming a belt-confining passage therebetween, a belt-holding pawl on the cartridge guide and extending into said passage and adapted to support the weight of the belt below said pawl, said feed and holding pawls of the auxiliary feed being so coordinated with the feeding pawl of the main feed mechanism as to occasion a slack in the belt between the holding pawl of the auxiliary mechanism and the belt feeding device of the main feed mechanism.

SAMUEL G. GREEN.